United States Patent
Engeli et al.

(10) Patent No.: US 6,485,236 B1
(45) Date of Patent: Nov. 26, 2002

(54) METHOD FOR PROCESSING WORK PIECES BY REMOVING MATERIAL

(75) Inventors: Max Engeli, Langnau am Albis (CH); Jorg Waldvogel, Kloten (CH); Thomas Schnider, Zurich (CH)

(73) Assignee: Starrag, Rorschacherberg (CH)

( * ) Notice: Subject to any disclaimer, the term of this patent is extended or adjusted under 35 U.S.C. 154(b) by 0 days.

(21) Appl. No.: 09/581,972

(22) PCT Filed: Dec. 8, 1998

(86) PCT No.: PCT/IB98/01949

§ 371 (c)(1),
(2), (4) Date: Sep. 20, 2000

(87) PCT Pub. No.: WO99/32949

PCT Pub. Date: Jul. 1, 1999

(30) Foreign Application Priority Data

Dec. 22, 1997 (CH) ................................. 2944/97

(51) Int. Cl.[7] ........................... B23C 3/00; B23Q 15/14; G06F 19/00
(52) U.S. Cl. ........................ 409/132; 409/80; 700/175; 700/187; 700/189
(58) Field of Search ................................. 409/131, 132, 409/79, 80; 700/175, 186, 187, 189, 193

(56) References Cited

U.S. PATENT DOCUMENTS

| | | | |
|---|---|---|---|
| 4,945,487 A | * | 7/1990 | Kimura et al. .............. 700/187 |
| 5,033,005 A | | 7/1991 | Haske |
| 5,257,203 A | | 10/1993 | Riley et al. |
| 5,363,309 A | | 11/1994 | Loh |
| 6,223,095 B1 | * | 4/2001 | Yamazaki et al. .......... 700/187 |
| 6,311,098 B1 | * | 10/2001 | Higasayama et al. ....... 700/187 |

FOREIGN PATENT DOCUMENTS

EP 0 798 616 10/1997

OTHER PUBLICATIONS

Luo et al., Free Form Surface Representation and Machining for Complex Parts, Aug. 1994, IEEE, pp. 2897–2902.*
Warkentin et al. "Five–Axis Milling of Spherical Surfaces," *International Journal of Mechanical Tools Manufacturing*, vol. 36, No. 2 (1996): pp. 229–243.
Kruth et al. "Optimization and Dynamic Adaptation of the Cutter Inclination During Five–Axis Milling of Sculptured Surfaces," *Annals of CIRP*, vol. 43, No. 1 (1994): pp. 443–448.
EPO International Search Report dated Mar. 18, 1999.

* cited by examiner

*Primary Examiner*—A. L. Wellington
*Assistant Examiner*—Erica E Cadugan
(74) *Attorney, Agent, or Firm*—Merchant & Gould P.C.

(57) ABSTRACT

The invention relates to a method for processing a work piece by removing material with a tool in which the tool is guided over the work piece in paths. The pivoting and cambering angle of the tool is selected in every point such that the width of a tolerance zone is optimized. Within said zone, the effective zone (K) of the tool is located in a tolerance zone of the desired specified surface (Psi) of the work piece. The distance between two points (Pl, Pr) is maximized, said points characterizing the furthest outlying points of the tolerance zone. As a result, it possible to produce surfaces having a high precision with a small number of paths.

11 Claims, 6 Drawing Sheets

METHOD FOR PROCESSING WORK PIECES BY REMOVING MATERIAL

CROSS REFERENCE TO RELATED APPLICATIONS

This application claims the priority of Swiss patent application 2944/97, filed Dec. 22, 1997, the disclosure of which is incorporated herein by reference in its entirety.

TECHNICAL FIELD

The invention relates to a method for processing workpieces by removing material.

Such methods serve e.g. for generating the paths of tools having five axes in CAD (Computer Aided Design)/CAM (Computer Aided Manufacturing) systems for the processing of workpieces with arbitrary surfaces.

STATE OF THE ART

All known methods for tool fitting start from from pre-defined contact paths of the tool on the workpiece. The position and orientation or the inclination angle (angle between the axis of the tool in the direction of movement of the tool and a vector normal to the desired surface) and the tilting angle (angle of the axis of the tool in the direction perpendicular to the direction of movement) are determined in different ways for selected points on the contact path. The presently best method (Jean-Pierr Kruth and Paul Klewais, Optimization and Dynamic Adaptation of the Cutter Inclination during Five-Axis Milling of Sculptured Surfaces, Annals of the CIRP, 1994) is based, for the determination of inclination and tilt angle, on projections of quadratic approximations of the workpiece and the tool. A quadratic equation for calculating the critical inclination angle (inclination angle where there is no more undercut at the approximations) is derived for constant tilt angles. In these methods the processing remains also still complicated in spite of the limited accuracy (danger of collision)

SUMMARY OF THE INVENTION

Hence, the problem to be solved is to provide a method of the type mentioned initially that avoids at least partially the disadvantages of known methods. In particular, a fast and therefore cheap processing should become possible.

This problem is solved with the object of the invention. In general, a tool is led along paths (B) over the workpiece, whereby material getting into a cutting range ($\tau$) of the tool is removed for generating a desired surface ($\psi$). The workpiece is positioned along its path by repetitively adjusting at least an inclination and a tilting angle of the tool in such a way that a magnitude of the area of tolerance is substantially maximum, where the area of tolerance is a continuous area within which the distance between the desired surface and the cutting range of the tool lies within a given range of acceptable mismatch.

In contrast to know methods, no local fitting in the area of the point of contact but a non-local optimization of a quantity, e.g. the width of the area of tolerance, is carried out, whereby the number of machining paths can be reduced and processing can be rationalized.

Preferably, the tilt and inclination angles are chosen such that the tool always remains above the desired surface. This allows a better manual finishing of the surface for adapting it to the desired shape. For the known method by Kruth and Klewais it can be shown using the exact descriptions of tool and workpiece surfaces that the tool can damage the workpiece (in particular when using large tools).

In an other preferred embodiment the tool paths are chosen such that for each point on the desired surface the area of tolerance and the direction of the maximum diameter of the area of tolerance are determined. The tool paths are chosen substantially perpendicular to this diameter, whereby the number of tool paths can be reduced.

In a further embodiment of the invention a fitting curve is determined for a point on the desired surface, which corresponds in its derivatives, in particular in its curvature, derivative of curvature and torsion at the given point, to a cutting curve that describes the cutting range of the tool (formed by all points that have a minimum distance to the desired surface). As shown in the following, such a method allows to determine a well adapted position of the tool in computationally simple manner.

Examples for processing methods where the present method can be used are five axis milling, grinding, erosion, lathing. Examples for workpieces are outer skin sections for airplanes, cars or ships, flow guiding pieces such as turbine blades, designer items, etc.

BRIEF DESCRIPTION OF THE DRAWINGS

Further advantages and applications of the inventions are given in the dependent claims as well as the now following description referring to the figures, wherein:

FIG. 4a Hermite-method: A given surface $\psi$ with two fitting points $P_0$ and $P_2$, fitted central torus circle K with given large diameter a;

FIG. 4b representation of the distance functions between the fitting points of FIG. 4a;

FIG. 5a Hermite-Chebishev-method: given surface $\psi$ with two fitting points $P_0$ and $P_2$, fitted central torus circle K and points $P_l$ and $P_r$ where stol is exceeded;

FIG. 5b representation of the distance function of the arrangement of FIG. 5a

EMBODIMENTS OF THE INVENTION

In the following discussion, the present problem is first discussed from a mathematical point of view. Then different embodiments of the method according to the present invention are presented.

Tool

Figure 1:
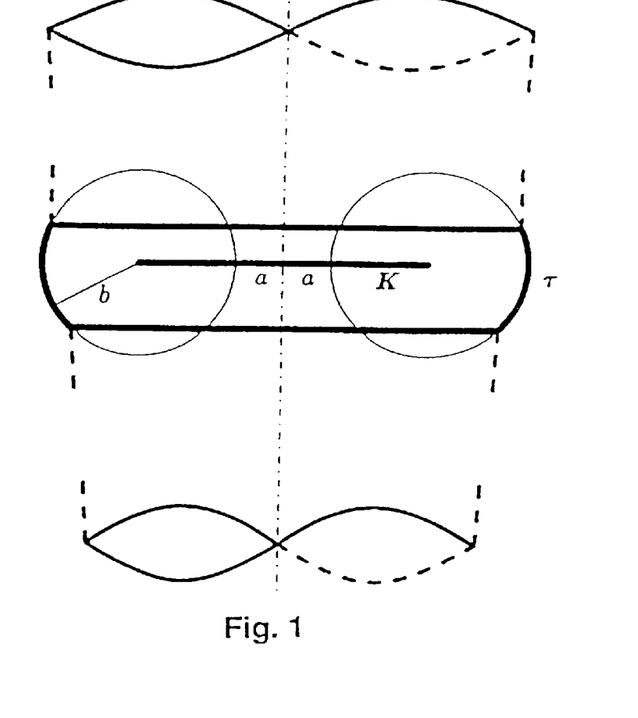
FIG. 1 is a rotationally symmetric tool with torus segment acting on the workpiece (the central circle K of the torus has a radius a, the small torus diameter is b)

Discussed are rotationally symmetric tools, where a torus segment τ acts on the workpiece as it is shown in FIG. 1, wherein the torus segment τ describes the cutting range of the tool, i.e. the range within which material of the workpiece is removed.

The tool can be any tool for machining by removal of material, such as a rotating milling cutter or the working electrodes of an apparatus for electro-erosive machining.

The large radius of the torus τ is designated by a, the small radius by b, and the torus center circle by K. A possible parameterization of the torus is:

$$\tau(t, s) := \begin{pmatrix} (a + b * \cos(t)) * \cos(s) \\ (a + b * \cos(t)) * \sin(s) \\ b * \sin(t) \end{pmatrix}.$$

Figure 2:
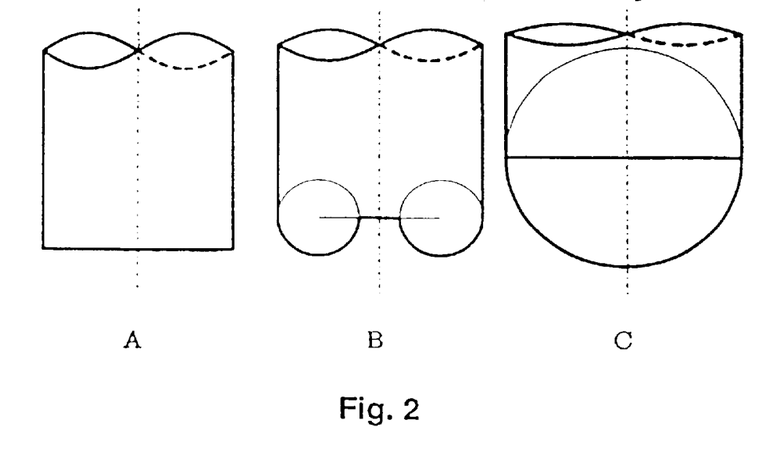
FIG. 2 examples of different tools: cylindric tool (A), torus tool (B), spherical tool (C)

FIG. 2 shows typical examples: cylindric tools (a >0, b=0), torus tools (a>b>0) and spherical tools (a=0, b>0).

Spherical tools do not allow to improve the local fit quality because they lack a degree of freedom. They are not to be discussed here further.

Workpiece

The notations <.,.> for the Euclidean scalar product, ||.|| for the Euclidean norm, .x. for the vector product and d(P, Q):=||P−Q|| for the Euclidean distance between two points P, Q are used. Let ψ(u,v) ∈ $C^4([0,1]^2, R^3)$ be a desired surface of a workpiece, i.e. the desired surface after machining. Examples of types of mathematical descriptions for desired surfaces are Bezier surfaces, rational Bezier surfaces, B-spliens and NURBS (Non Uniform Rotational B-Splines). For partial derivatives, the designation $\psi_\sigma$ with σ ∈ is used. With the help of the normal vector n:=$\psi_u \times \psi_v$, the d-offset and the d-prallel surfaces can be described:

$$d\psi := \psi + d\frac{n}{\|n\|}.$$

Optimum fitting

In the following we discuss how the tool is to be oriented in respect to the workpiece at each point such that a best possible fit to the desired surface results.

The local optimum fit of tools of the type described above on desired surfaces can be formulated by nonlinear sets of equations, whereby we distinguish between three fitting types, which are designated here by Taylor, Hermite, and Hermite-Chebishev method. The theoretically best possible fit is achieved by the Hermite-Chebyshev method. "Best possible fit" means that for a given acceptable mismatch band (range of acceptable mismatch) in a direction normal to the desired surface (usually, the acceptable mismatch band is completely above the desired surface) the Hermite-Chebyshev method yields the largest area on the surface where the acceptable mismatch is not exceeded. The calculating method is given by the Hermite method. The Hermite-method results in approximately 30% narrower tracks. The less computationally expensive Taylor method yields tracks of approximately the same width as the Hermite method and can be used for providing starting values for the Hermite method.

For all three fitting methods the systems of equations are formulated for cylindrical tools. If the torus is shrunk to the center circle of the torus and, at the same time, parallel surfaces to the desired surface are calculated, the distance between the torus (degenerating to the torus center circle) and the parallel surface remains unchanged (see FIG. 13).

Figure 13:
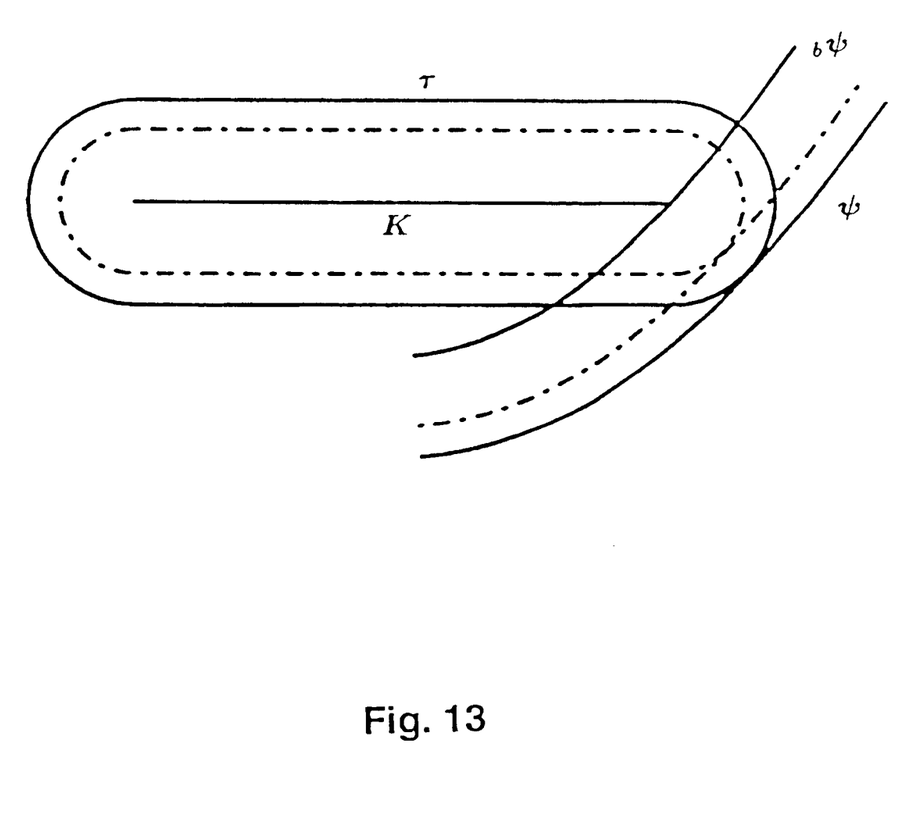
FIG. 13 reduction of the torus to its central circle with simultaneous construction of parallel surfaces.

Expressed in mathematical terms, a circle is positioned in locally best manner on the desired surface using different criteria. For tools with b>0, the b-parallel surfaces $_b\psi$ and $_{-b}\psi$ are used, and the torus center circle K is adapted using the methods for cylindrical tools.

Figure 6A:
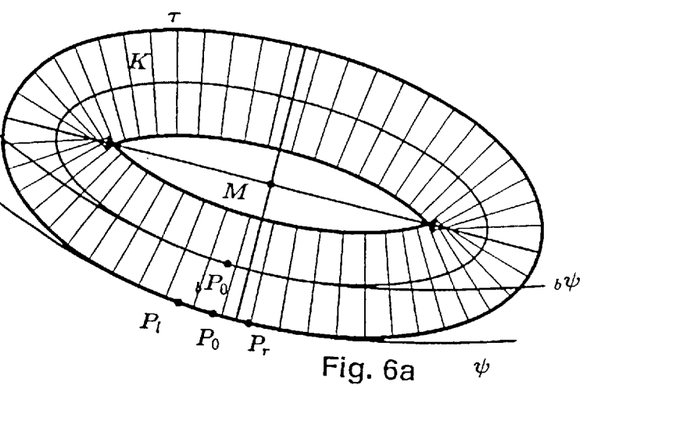
FIG. 6a Taylor-method: The local optimum fitting of $\tau$ to $\psi$ is equivalent to the local fitting of K to $_b\psi$.

FIG. 6a shows graphically, for the example of the Taylor method, the fact that a locally best fit of τ to ψ is equivalent to the locally best fit of K to parallel surfaces $_b\psi$ and $_{-b}\psi$, respectively. This fact holds true for all three fitting methods. This means, in particular, that for all three fitting methods the quality of the fit between τ and ψ is exactly equal to the fit between K and $_b\psi$ (or $_{-b}\psi$). This statement is used to obtain a very quick estimate for the range of acceptable mismatch (the range where the tool deviates by less than a predefined quantity stol from the workpiece surface).

Hermite method

Figures 4A, 4B:
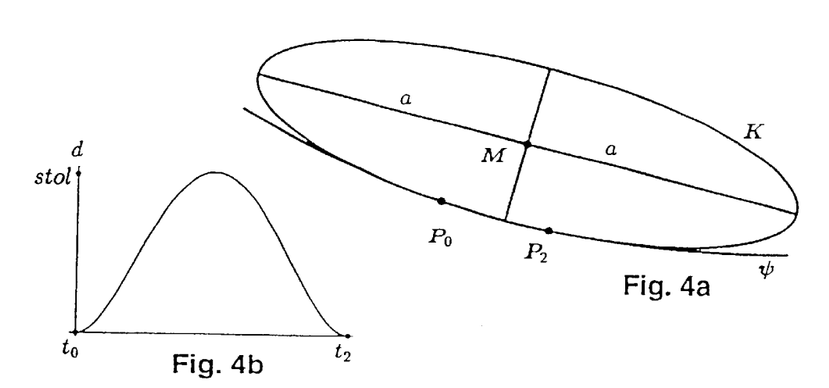

In the Hermite method, two fitting points $P_0$ and $P_2$ located close to each other are used, at which points the tool is to touch the desired surface ψ (FIGS. 4a, 4b). The Hermite fitting problem is solved, in the present case, for a cylindric tool, i.e. for a circle. (It would be possible to use an arbitrary curve, e.g. an ellipse, instead of a circle. The expressions (1)–(4) would have to be adapted correspondingly.) The circle is to touch the desired surface in the two fitting points $P_0$ and $P_2$.

Figure 3:
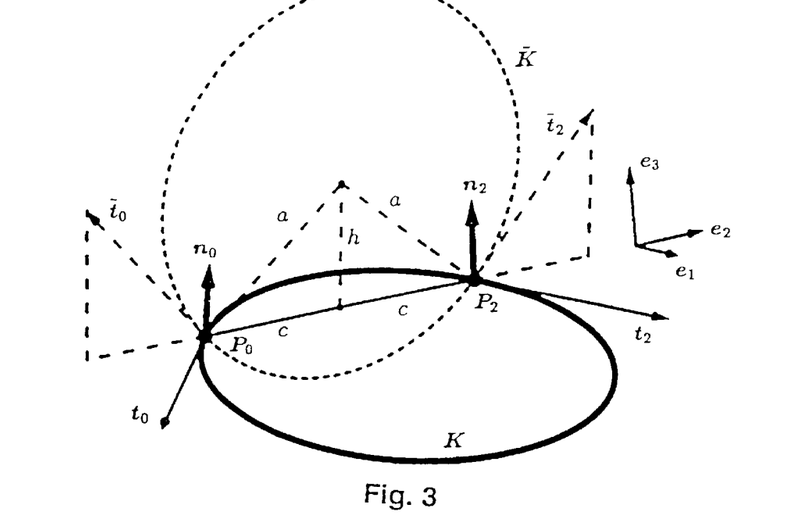
FIG. 3 Hermite-method: The circle $\tilde{K}$ is to be rotated about an angle $\theta$ around $e_2$ such that the tangential vector $\tilde{t}_0$ becomes perpendicular to the normal vector $n_0$—the solution is the circle K.

For deriving the system of equations, two close points $P_0:=\psi(u_0,v_0)$, $P_2:=\psi(u_2,v_2)$ are used. The corresponding normal vectors are designated by $n_0$, $n_2$, the connecting vector $P_2-P_0$ by v and its length by 2c (FIG. 3). The vectors $n_0$, $n_2$ and v will typically not be located in the same plane, and furthermore, $n_0$ and $n_2$ will not be perpendicular to v.

For solving the Hermite fitting problem, the coordinate system with the base vectors $e_2:=v/\|v\|$, $$e_1 := \frac{e_2 \times n_0}{\|e_2 \times n_0\|} \text{ and } e_3 := e_1 \times e_2$$

are introduced.

The basic idea is to rotate a circle $\tilde{K}$, which is lying in the plane $e_2$, $e_3$, has a given diameter 2a and intersects $P_0$ and $P_2$, around $e_2$ until the tangential vector $\tilde{t}_0$ in $P_0$ becomes perpendicular to $n_0$. The tangential vector $\tilde{t}_0$ has, in the coordinate system $e_1$, $e_2$, $e_3$, the components $(0, -h, c)^T$, wherein h:=$\sqrt{a^2-c^2}$ and $n_0$ has the coordinates $(0, <n_0, e_2>, <n_0, e_3>)^T$. The equation $$\left\langle \begin{pmatrix} \cos(\theta) & 0 & -\sin(\theta) \\ 0 & 1 & 0 \\ \sin(\theta) & 0 & \cos \end{pmatrix} \begin{pmatrix} 0 \\ -h \\ c \end{pmatrix}, \begin{pmatrix} 0 \\ <n_0, e_2> \\ <n_0, e_3> \end{pmatrix} \right\rangle = 0 \quad (1)$$

now determines the cosine of the angle of rotation θ, $$\cos(\theta) = \frac{h <n_0, e_2>}{c <n_0, e_3>}, \quad (2)$$

and the tangential vectors of K in $P_0$ and $P_2$ are $$t_0 = -c^*\sin(\theta)e_1 - he_2 + c\cos(\theta)e_3 \quad (3)$$

$$t_2 = -c^*\sin(\theta)e_1 + he_2 + c\cos(\theta)e_3 \quad (4)$$

Hence, the position of the circle K has now been determined from $P_0$, $P_2$ and $n_0$. The circle K is in general not perpendicular to $n_2$: $<n_2, t_2> \neq 0$.

Therefore, the problem lies in the fact that the fit according to the Hermite method can not be carried out for two arbitrarily selected points. The relative Position of $P_0$ and $P_2$ and the normal vectors $n_0$, $n_2$ in these points determines if a solution exists or not. In the following, a procedure is recommended that allows to find such pairs of points.

Let $P_0:=\psi(u_0,v_0)$ be a point on $\psi$. We look for points $P_2:=\psi(u_0+\Delta u, v_0+\Delta v)$ in an area of $P_0$, for which a fit of the Hermite method exists. This area ist first chosen arbitrarily, e.g. as a circle around $(u_0, v_0)$ in the parameter plane $$\Delta u^2 + \Delta v^2 = r^2. \quad (5)$$

With the above construction, the position of the fitting circle and therefore the tangent $t_2$ is calculated for $P_0$, $P_2$ and $n_0$. We request that the tangent $t_2$ is perpendicular on $n_2$:

$$<n_2(\Delta u, \Delta v), t_2(\Delta u, \Delta v)> = 0. \quad (6)$$

Figure 8:
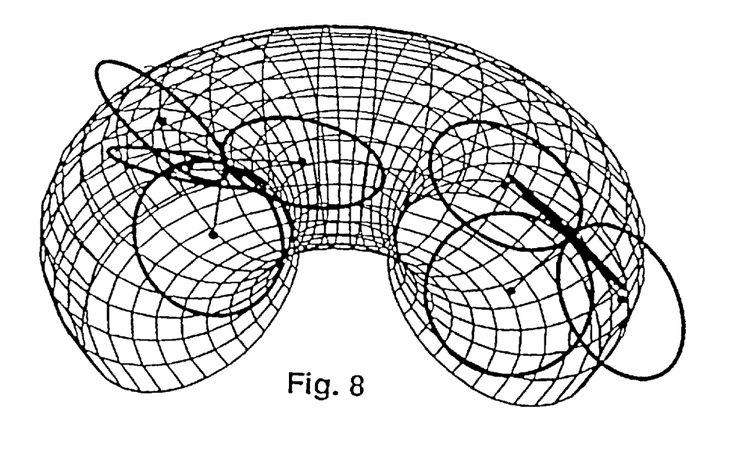
FIG. 8 the quadrupel of solutions for hyperbolic (left) and elliptic (right) point of the torus surface (in the right quadrupel of solutions the forth solution is covered by the torus surface)

In this way, a system of equations for finding points $P_2$ is defined by (5) and (6). It is best solved by parametrisation of the circle (5) and insertion in (6). The resulting equation can then be solved by a secant algorithm. In this way, τ has been positioned relative to ψ:

$$\Omega\tau(t, s) + v,$$

wherein Ω is an orientation and v a position. There results a quadrupel of solutions (two solutions for machining the outer surface and the two other solutions for machining the inner surface). This can especially well be solved for the special case of the torus surfaces (cf. example for the Taylor method, FIG. 8).

For the tool fitted by the Hermite method the distance function between τ and ψ between the fitting points $P_0=\tau(t_0, s_0)$ and $P_2=\tau(t_2, s_0)$ is of the form (cf. FIG. 4b)

$$d(t) = k\left(\left(t - t_o - \frac{t_2 - t_0}{2}\right)^2 - \left(\frac{t_2 - t_0}{2}\right)^2\right)^2 + O(t^5) \quad (7)$$

this function fulfills $d(t_0)=d'(t_0)=d(t_2)=d'(t_2)$ and has at $(t_2+t_0)/2$ a maximum:

$$k\left(\frac{t_2 - t_0}{2}\right)^4. \quad (8)$$

In order to find, starting from $P_0$, the point $P_2$ on A, for which the maximum of the distance within $P_0$ and $P_2$ is to be equal stol, the following steps are repeated iteratively until the desired accuracy has been reached:

As described above, $P_2$ is determined. For measuring the distance, the contacting circle $C(t):=\Omega\tau(t, s_0)+v$ in τ to ψ is used. The maximum distance between C and ψ can be calculated by solving $$d^* = \max_{t, u, v} d(C(t), \psi(u, v)). \quad (9)$$

With the statement regarding the fitting quality, the constant k can be calculated:

$$k = \frac{d^*}{(t^* - t_0)^4}. \quad (10)$$

From this, the parameter $\hat{t}_2$ is determined, for which the distance is approximately equal to stol:

$$t_2 = t_0 + 2\left(\frac{stol}{k}\right)^{\frac{1}{4}}. \quad (11)$$

The factor $f:=(\hat{t}_2-t_0)/(t_2-t_0)$ is applied to the radius r in (5), $$\Delta u_2 + \Delta v_2 = (fr)_2 \quad (12)$$

and the problem is solved using (12), (6). This whole procedure is iterated until the desired accuracy is achieved.

Hermite-Chebyshev Method

Figures 5A, 5B:
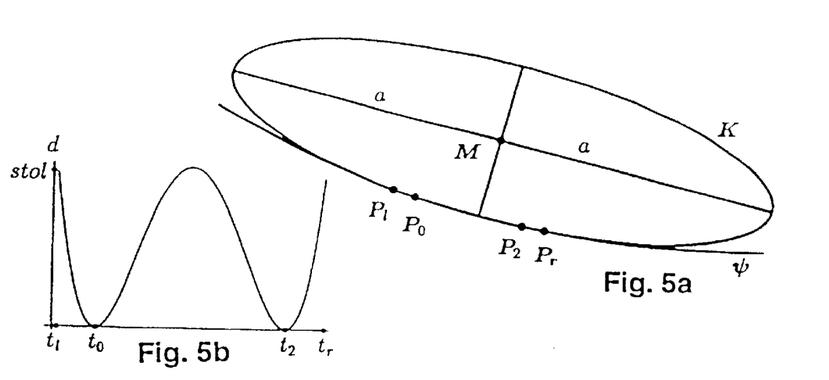

For the Hermite-Chebyshev Method, the calculating procedure for optimum fitting of the Hermite method is used. This means that the distance function d is exactly the same as well. But the width of application of the tool can be increased by adding the ranges where stol is not exceeded (below $P_0$ to $P_1$ and above $P_2$ to $P_r$, see FIGS. 5a, 5b). A short calculation shows that approximately at the positions $$t_1 = t_0 - (\sqrt{2} - 1)t_2 - \frac{t_0}{2} \quad (13)$$

$$t_r = t_2 + (\sqrt{2} - 1)t_2 - \frac{t_0}{2} \quad (14)$$

d(t) has value equal to its maximum $k((t_2-t_0)/2)^4$ between $P_0$ and $P_2$. This expands the width of application of the Hermite-Chebyshev approach as compared to the Hermite approach approximately by a factor √2. i.e. the number of tool pathes is reduced by approximately 30%. For the Hermite and Hermite-Chebyshev methods the risk of collisions close to the point of contact is smaller than for the Taylor method.

For a more accurate calculation it is also conceivable to determine the points $P_1$ and $P_r$ for each pair of contact points $P_0$, $P_2$ numerically in direct manner, i.e. not by using the approximations (13) and (14). Therfrom, the distance between $P_1$ and $P_r$ can be calculated and then be optimized.

Taylor Method

Figure 7:
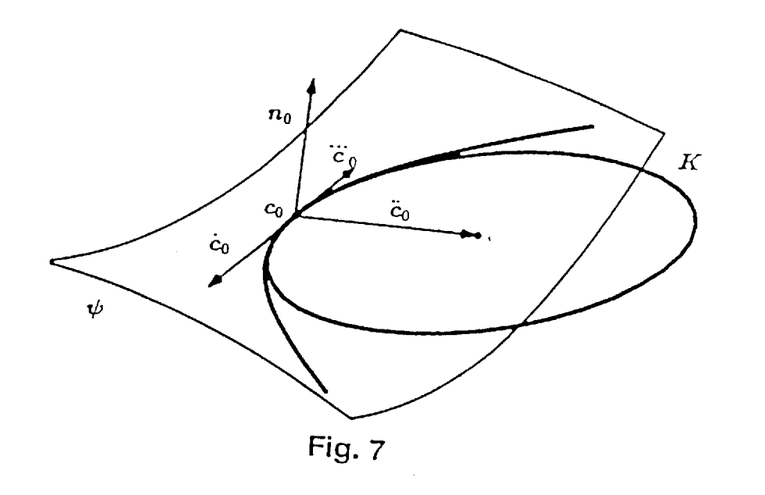
FIG. 7 Taylor-method: desired surface $\psi$ with surface curve c for the Taylor series of which the first three terms correspond to the Taylor series of a circle in fitting point $P_0=-c_0$.

In contrast to the two preceding fitting methods, only one point of contact $P_0=c_0:=\psi(u_0, v_0)$ is used in the Taylor method. In point $P_0$ a circle is to be set optimally according to Taylor on the surface. The basic idea for solving this problem is to search for the Taylor series $c(t):=\psi(u(t), v(t))$ of a fitting curve going through $P_0$ and contained within q that most closely resembles the circle in the point $c_0$ (cf. FIG. 7). The circle describes, at least locally, the cutting range of the tool and is described as its cutting curve.

Hence, the Taylor series (15)–(17) at $c_0$ parametrized along the length of the curve should there have the same curvature (18), derivative of curvature (19) and torsion (20) as the circle (with the system of equations (15)–(20) it is possible to fit arbitrary cutting curves with given local torsion and derivative of curvature; e.g. an ellipse for a given fitting point on the ellipse):

$$\langle \dot{c}_0, \dot{c}_0 \rangle = 1 \tag{15}$$

$$\langle \dot{c}_0, \ddot{c}_0 \rangle = 0 \tag{16}$$

$$\langle \dot{c}_0, \dddot{c}_0 \rangle + \langle \ddot{c}_0, \ddot{c}_0 \rangle = 0 \tag{17}$$

$$\langle \ddot{c}_0, \ddot{c}_0 \rangle = 1/a^2 \tag{18}$$

$$\langle \ddot{c}_0, \dddot{c}_0 \rangle = 0 \tag{19}$$

$$\langle \dot{c}_0 \times \ddot{c}_0, \dddot{c}_0 \rangle = 0 \tag{20}$$

For a circle, (15)–(20) with six equations and six unknowns can be reduced to a nonlinear system of equations with four equations and unknowns. For abbreviation, the notation $\psi_\tau$ is from now on used for $\psi_\tau(u_0, v_0)$. From (17), (19) and (20) follows that $\dddot{c}_{00}$ has to be anti-parallel to $c_0$. Since $c_0$ is a linear combination of $\psi_u$ and $\psi_v$ and $n_0 := n(u_0, v_0)$ is perpendicular to these two vectors, $\dddot{c}_{00}$ must also be perpendicular to $n_0$. Considering a Taylor series developed in $c_0$ parametrized along the length of the curve, $$c_0 = \Psi_u \dot{u} + \Psi_v \dot{v}$$
$$\ddot{c}_0 = \Psi_u \ddot{u} + \Psi_v \ddot{v} + \Psi_{uu} \dot{u}^2 + 2\Psi_{uv} \dot{u}\dot{v} + \Psi_{vv} \dot{v}^2$$
$$\dddot{c}_{00} = \Psi_u \dddot{c}_0 + \Psi_v \dddot{c}_0 + 3\Psi_{uu} \dot{u}\ddot{u} + 3\Psi_{uv}$$
$$(\ddot{u}\dot{v} + \dot{u}\ddot{v}) + 3\Psi_{vv} \dot{v}\ddot{v} +$$
$$\Psi_{uuu}\dot{u}^3 + 3\Psi_{uuv}\dot{u}^2\dot{v} 3\Psi_{uvv}$$
$$\dot{u}\dot{v}^2 + \Psi_{vvv}\dot{v}^3,$$

shows that in the reduced system of equations $$\langle \dot{c}_0, \dot{c}_0 \rangle = 1 \tag{21}$$

$$\langle \dot{c}_0, \ddot{c}_0 \rangle = 0 \tag{22}$$

$$\langle \ddot{c}_0, \ddot{c}_0 \rangle = 1/a^2 \tag{23}$$

$$\langle \ddot{c}_0, n_0 \rangle = 0 \tag{24}$$

the terms with $\dddot{c}_0$ and $\ddot{c}_0$ are eliminated. This means that the length and orientation of an optimally fitted circle are determined by calculating the coefficients $\dot{u}, \dot{v}, \ddot{u}, \ddot{v}$ of the desired curve parametrization in the plane of the parameters (u, v). In its full length and using the abbreviations $g_{o,\mu} := \langle \psi_o, \psi_\mu \rangle$ the system equations is as follows:

$$\langle \dot{c}_0, \dot{c}_0 \rangle = g_{u,u}\dot{u}^2 + 2g_{u,v}\dot{u}\dot{v} + g_{v,v}\dot{v}^2 \tag{25}$$

$$\langle \dot{c}_0, \ddot{c}_0 \rangle = g_{u,uu}\dot{u}^3 + (2g_{u,uv} + g_{v,uu})\dot{u}^2\dot{v} + (2g_{v,uv} + g_{u,uv})\dot{u}\dot{v}^2 + g_{v,vv}\dot{v}^3$$
$$g_{u,u}\dot{u}\ddot{u} + g_{u,v}\dot{u}\ddot{v} + g_{u,v}\ddot{u}\dot{v} + g_{v,v}\dot{v}\ddot{v}$$

$$\langle \ddot{c}_0, \ddot{c}_0 \rangle = g_{uu,uu}\dot{u}^4 + 4g_{uu,uv}\dot{u}^3\dot{v} + 2(g_{uu,vv} + 2g_{uv,uv})\dot{u}^2\dot{v}^2 + 4g_{uv,vv}\dot{u}\dot{v}^3 +$$
$$g_{vv,vv}\dot{v}^4 + 2g_{u,uu}\dot{u}^2\ddot{u} + 4g_{u,uv}\dot{u}\dot{v}\ddot{u} + 2g_{u,vv}\dot{v}^2\ddot{u} + 2g_{v,uu}\dot{u}^2\ddot{v} +$$
$$4g_{v,uv}\dot{u}\dot{v}\ddot{v} + 2g_{v,vv}\dot{v}^2\ddot{v} + g_{u,u}\ddot{u}^2 + 2g_{u,v}\ddot{u}\ddot{v} + g_{v,v}\ddot{v}^2$$

$$\langle \ddot{c}_0, n_0 \rangle = g_{uuu,n}\dot{u}^3 + 3g_{uuv,n}\dot{u}^2\dot{v} + 3g_{uvv,n}\dot{u}\dot{v}^2 + g_{vvv,n}\dot{v}^3$$
$$3g_{uu,n}\dot{u}\ddot{u} + 3g_{uv,n}\dot{u}\ddot{v} + 3g_{uv,n}\dot{v}\ddot{u} + 3g_{vv,n}\dot{v}\ddot{v}$$

This non-linear algebraic system of equations for the unknowns $\dot{u}, \dot{v}, \ddot{u}$ and $\ddot{v}$ and $\psi$ can be solved using a Newton method. Again, quadrupels of solutions result. Torus surfaces locally approximating the desired surface $\psi$ can be used for finding starting values for the solutions of the system of equations (25).

Figure 6B:
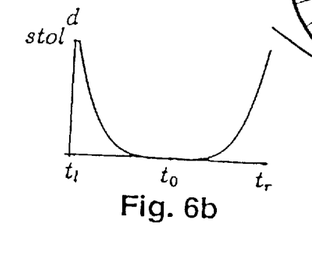
FIG. 6b distance function for FIG. 6a up to the points $P_l$ and $P_r$ where stol is exceeded.

For a tool fitted according to the Taylor method the distance function d between $\tau$ and $\psi$ in the proximity of the fitting point $P_0 = \tau(t_0, s_0)$ is of the type (cf. FIG. 6b):

$$d(t) = k(t-t_0)_4 + O(t_5) \tag{26}$$

In order to calculate the one-sided width of application of the tool, the distance d* on $\psi$ is determined for a small circle $C(s) := \psi\tau(t_0, s_0)$ in the proximity of $P_0$ by solving $$d^* = \max_{t,u,v} d(C(t), \psi(u, v))$$

Because of its relevance for the fitting quality, the constant k can be calculated:

$$k = \frac{d^*}{(t^* - t_0)^4}$$

Therefrom the position is determined where the distance is approximately equal to stol:

$$t_r = t_0 + \left(\frac{stol}{k}\right)^{1/4}$$

This method is also iterated until the desired accuracy has been reached. The determination of $t_1$ is carried out in the same manner. In particular it is to be observed that the left- and right-sided widths of application are, in general, not equal.

Figure 9:
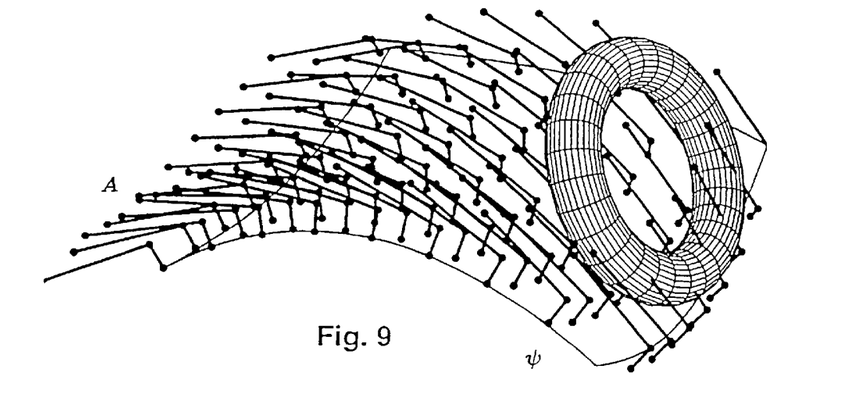
FIG. 9 desired surface $\psi$ with fitting vector field A for a torus tool—the short line segments start in the point of contact on $\psi$, extend in normal direction, and end in the point of contact on $_b\psi$, the long line segments start in the point of contact $_b\psi$ and end in the center of the torus.
Figure 10:
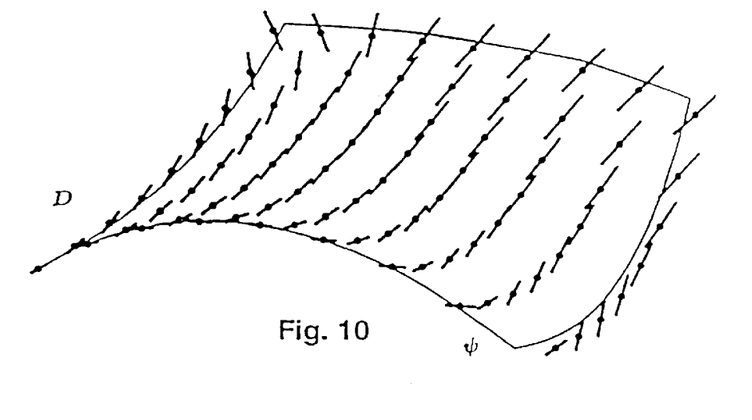
FIG. 10 the distance field D on $\psi$ for the fitting vector field A of FIG. 9.

In all three fitting methods described above there result different solutions of vector fields (Vf) for the position and orientation of the tool on $\psi$ (fitting vector field A, cf. FIG. 9). For the description of the distances of the paths the distance field D is used (cf. FIG. 10). This consists of a direction on $\psi$, a distance to the left and a distance to the right. The direction is the direction of the largest path width and the distances indicate how wide the path is in this direction for a given stol.

Further methods

As mentioned, the Hermite-Chebyshev method described above is presently the preferred method for evaluating the optimum tool orientation on each point on a mesh on the desired surface. In this method, for each point, the inclination and tilting angle of the tool is determined for which the distance between the points $P_l$ and $P_r$ is at least approximately a maximum. For this purpose, equations (5), (6) and (9) are solved, which leads to the result in a very efficient manner.

However, if sufficient computing power is available, other much more expensive solution methods can be used. For example, the optimum inclination and tilting angle can be calculated for each point by varying the two angles numerically and calculating, for each pair of angles, the width of the area of tolerance for a correct position of the tool, i.e. the width of the region within which the distance between the tool and the desired surface remains within stol. The pair of angles where this width is largest lies closest to the optimum.

Path selection

Figure 11:
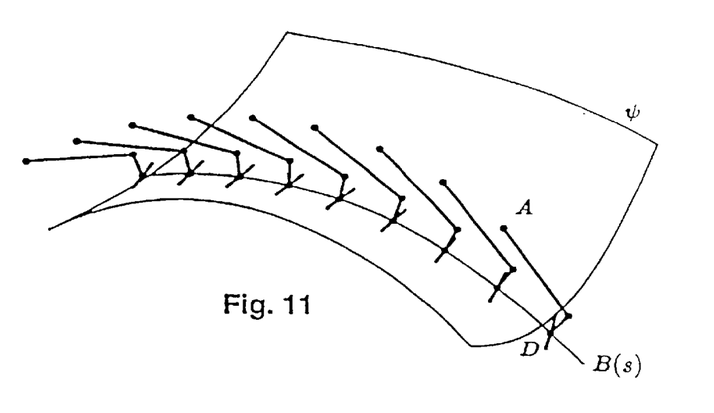
FIG. 11 the desired surface $\psi$ with contact path B(s):=$\psi$(u(s), v(s)), fitting vector field A along B and distance vector field D along B.
Figure 12:
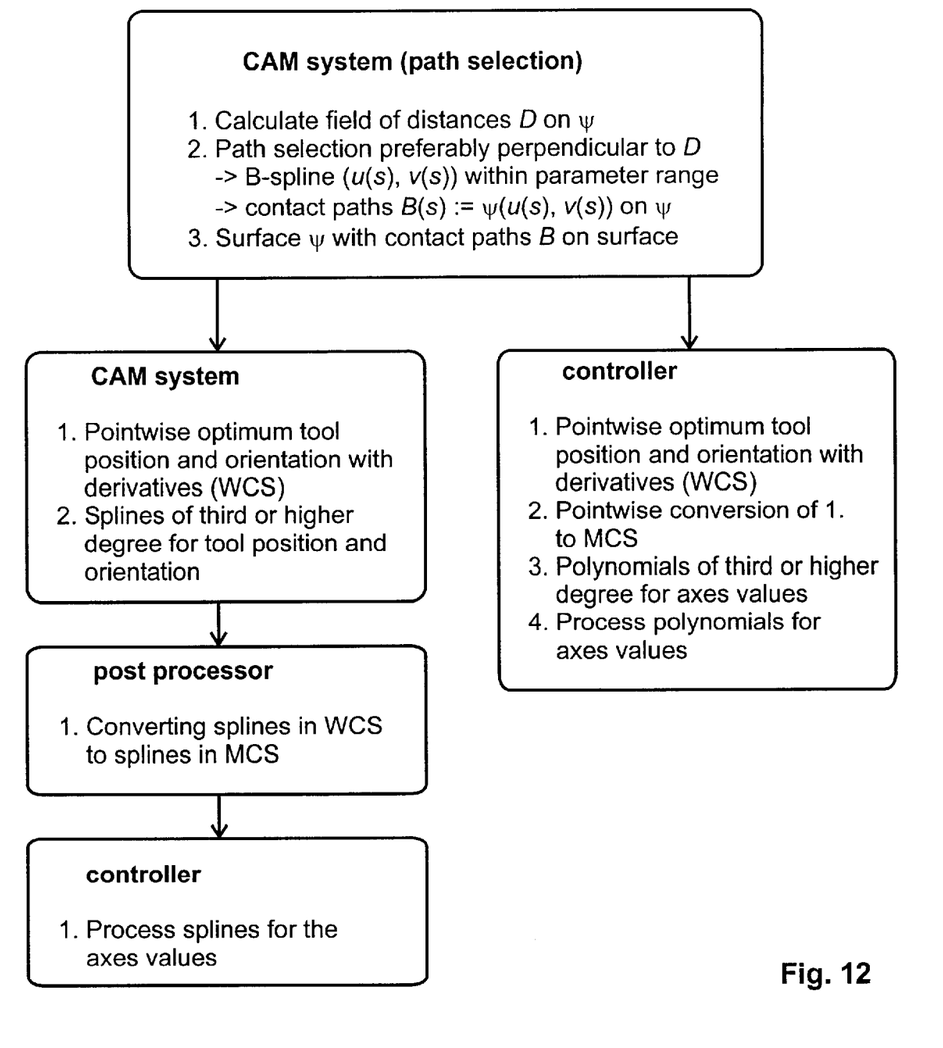
FIG. 12 two different possibilities for the computational processing of tool actuation instructions with local optimum fitting (the abbreviations WCS for workpiece coordinate system and MCS for machine coordinate system are used; the algorithms for optimum fitting can be used in the CAM system as well as in the tool controller)

After choosing A (which of the four solutions is to be used?) the contact paths of the tool on the workpiece can be determined with D as B-splines (u(s), v(s)) in the parameter plane: $B(s) := \psi(u(s), v(s))$ (see FIG. 11). For as large path widths as possible, B should preferably be perpendicular to the directions of path distance in the plane. For processing this in a controller, there are substantially two approaches (cf. FIG. 12):

1. In a CAM system the position and orientation of the tool and their derivatives are calculated on points along the paths of the tool. Splines of third order or higher are fitted through the points. There result at least $C_2$-continuous paths for the position and orientation of the tool in the coordinate system of the workpiece (WCS). In a post processor these splines are converted to tool axes splines. These tool axes splines are transferred to the controller.

2. The surface is transferred to the controller together with the contact paths as well as the information which solution is chosen. In the controller, optimum tool positions and orientations are calculated point by point. These are converted point by point into axis values and derivatives of the axis values. Polynomials of third or higher degree are fitted through the points. There result at least $C_2$-continuous polynomials for the axes values, which can be processed by the controller.

While the present application describes presently preferred embodiments of the invention, it is to be clearly understood that the invention is not limited thereto and can also be carried out in different manner within the scope of the following claims.

What is claimed is:

1. A method for processing the surface of a workpiece by removal of material with a tool, wherein the tool is led along paths over the workpiece, whereby material getting into a cutting range of the tool is removed for generating a desired surface, said method comprising the steps of:

repeatedly calculating an inclination and a tilting angle for the tool along the paths of the tool under the conditions that:
(a) the cutting range at the inclination and tilting angle contacts the desired surface of the workpiece at two points
(b) an area of tolerance exists being defined as a continuous area within which a distance between the desired surface and the cutting range of the tool lies within a given acceptable mismatch, wherein the inclination and tilting angles are calculated for each of a plurality of locations on the paths by numerically varying a position of at least one of the points until a width of the area of tolerance reaches a maximum value while keeping the distance within the given acceptable mismatch, and positioning said tool along the paths using the calculated inclination and tilting angles.

2. The method of claim 1, wherein the inclination and tilting angles are calculated under a condition that the tool is always above the desired surface.

3. The method of claim 1, wherein, for calculating the inclination and tilting angles, one of the two points is held fixed and the other is varied numerically.

4. The method of claim 1, wherein distances between the paths are selected depending on the width of the area of tolerance.

5. The method of claim 1, wherein said inclination and tilting angles are repeatedly calculated using a Hermite-Chebishev method.

6. A method for processing the surface of a workpiece by removal of material with a tool, wherein the tool is led along paths over the workpiece, whereby material getting into a cutting range of the tool is removed for generating a desired surface, said method comprising the steps of:

repeatedly calculating an inclination and a tilting angle for the tool along the paths of the tool under the condition that an area of tolerance exists that is defined as a continuous area within which a distance between the desired surface and the cutting range of the tool lies within a given acceptable mismatch, wherein the inclination and tilting angles are calculated for each of a plurality of points on the paths by numerically varying the inclination and tilting angles until a width of the area of tolerance reaches a maximum value while keeping the distance within the given acceptable mismatch, and positioning said tool along the paths using the calculated inclination and tilting angles.

7. A method for processing the surface of a workpiece by removal of material with a tool, wherein the tool is led along paths over the workpiece, whereby material getting into a cutting range of the tool is removed for generating a desired surface, said method comprising the steps of:

repeatedly calculating, for a plurality of points along said path, an inclination and a tilting angle for the tool along the paths of the tool such that, for each point,
(a) the cutting range at the inclination and tilting angle contacts the desired surface of the workpiece in exactly one point
(b) a curvature, a derivative of curvature and a torsion of a fitting curve through said point on the desired surface correspond to a curvature, a derivative of curvature and a torsion of a cutting curve through said point on the cutting range of the tool at the inclination and tilt angle, and positioning said tool along the path using the calculated inclination and tilting angles.

8. The method of claim 7, wherein the cutting curve is a circle.

9. The method of claim 7, wherein said inclination and tilting angles are repeatedly calculated using a Taylor method.

10. A method for processing the surface of a workpiece by removal of material with a tool, wherein the tool is led along paths over the workpiece, whereby material getting into a cutting range of the tool is removed for generating a desired surface, said method comprising the steps of repeatedly calculating an inclination and a tilting angle for the tool along the paths of the tool under the conditions that
(a) the cutting range at the inclination and tilting angle contacts the desired surface of the workpiece at two points
(b) between the two points, a first distance between the desired surface and the cutting range of the tool lies within a given acceptable mismatch
(c) a second distance between the two points is at a maximum value that permits the first distance to remain within the given acceptable mismatch at the inclination and tilting angle, wherein the inclination and tilting angles are calculated by numerically varying the position of at least one of the points in order to maximize the second distance between the two points while keeping the first distance within the given acceptable mismatch, and positioning said tool along the paths using the calculated inclination and tilting angles.

11. The method of claim 10, wherein said inclination and tilting angles are repeatedly calculated using a Hermite method.

* * * * *